April 28, 1959
O. R. MILLER
2,884,597
HIGH IMPEDANCE MULTIPLIER PROBE
Filed July 18, 1955
3 Sheets-Sheet 1
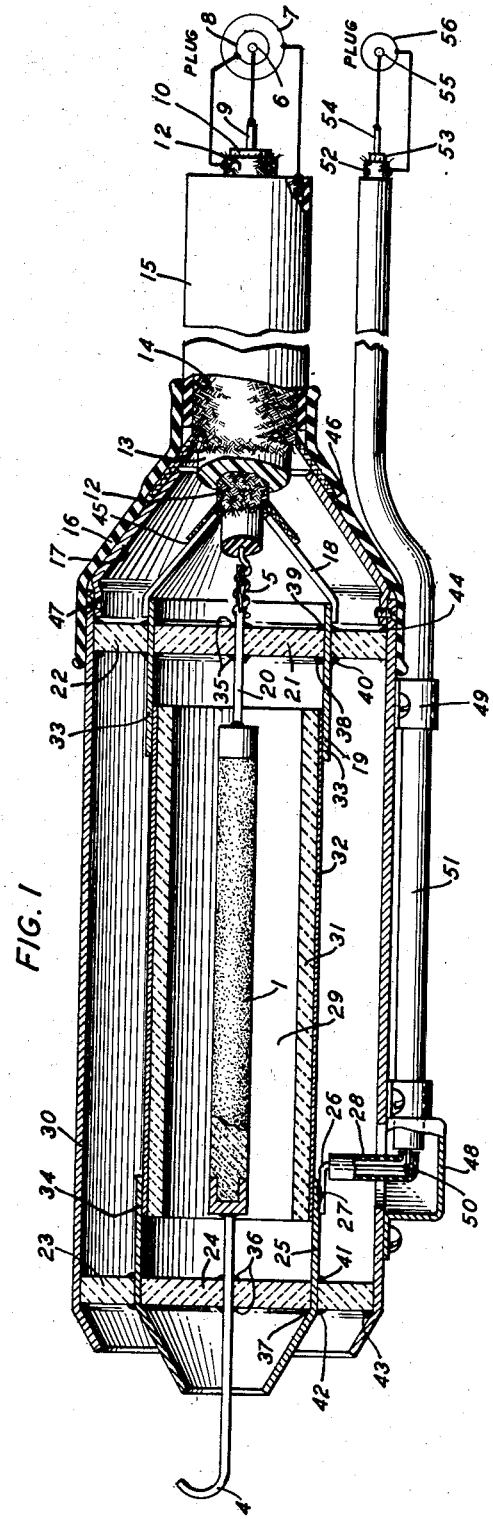
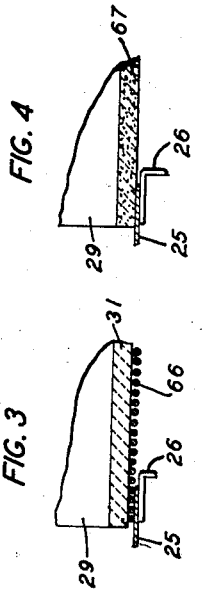
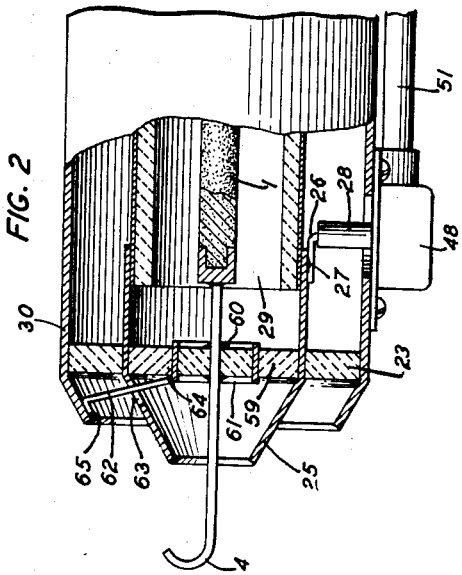
INVENTOR
O. R. MILLER
BY
Walter M. Hill
ATTORNEY April 28, 1959

O. R. MILLER 2,884,597

HIGH IMPEDANCE MULTIPLIER PROBE

Filed July 18, 1955

3 Sheets-Sheet 2

INVENTOR
O. R. MILLER
BY
Walter M. Hill
ATTORNEY

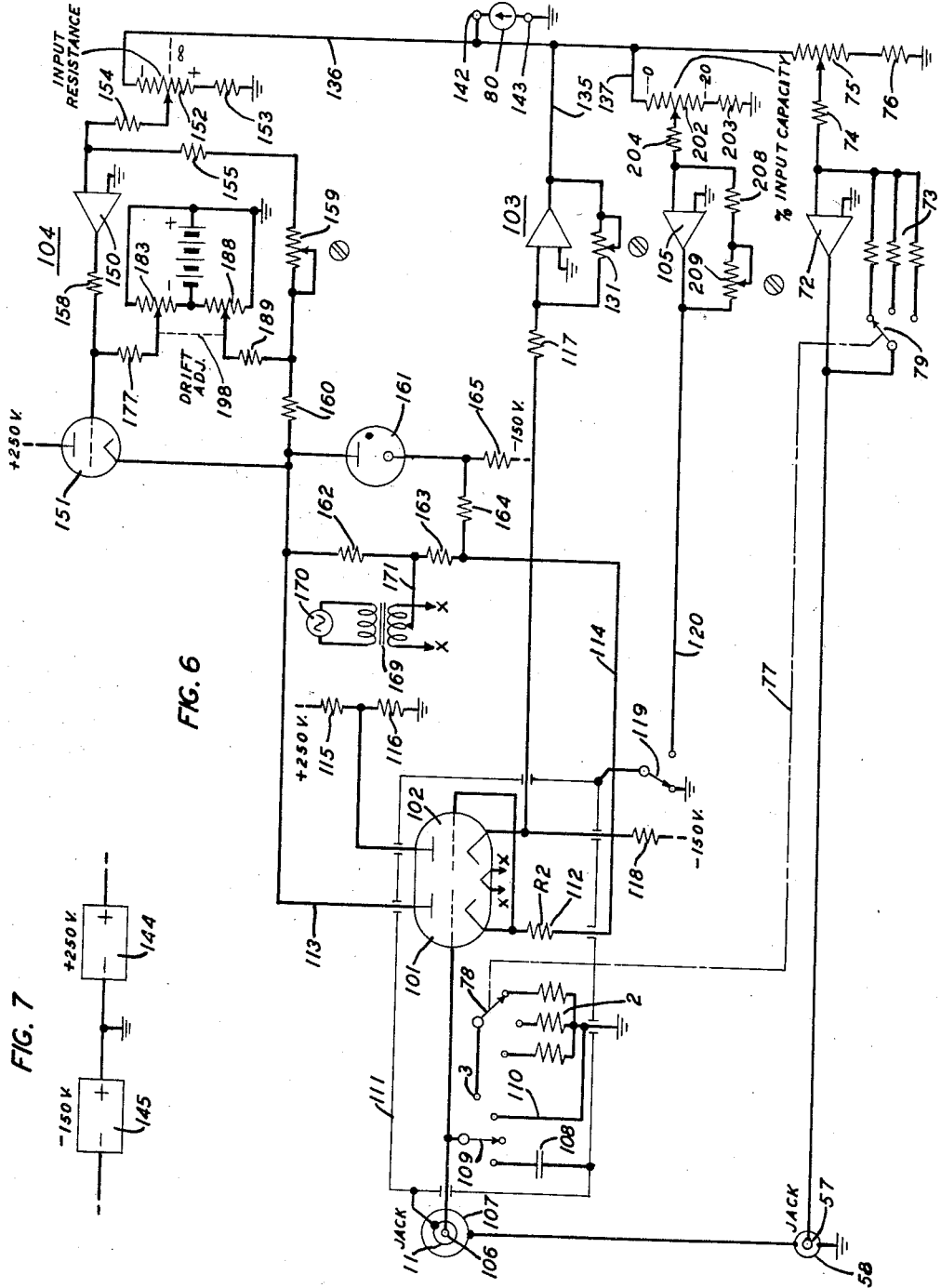

United States Patent Office 2,884,597
Patented Apr. 28, 1959

2,884,597

HIGH IMPEDANCE MULTIPLIER PROBE

Ohmer R. Miller, Morristown, N.J., assignor to Bell Telephone Laboratories, Incorporated, New York, N.Y., a corporation of New York Application July 18, 1955, Serial No. 522,586

5 Claims. (Cl. 324—149)

This invention relates to the art of electrical measurement and more particularly to a voltage multiplier probe for use with high impedance voltmeter circuits.

In the use of highly sensitive vacuum tube voltmeters for measuring voltages in very high impedance circuits, it is sometimes desirable to provide the meter circuit with a multiplying factor in order to extend the voltage range of the meter. One of the problems always present when measurements are made with high impedance circuits is the capacity loading effect of the probe structure. Where the source impedance is high enough, this capacity loading effect can become so large that voltage measurements with any degree of accuracy are quite impossible.

It is an object of this invention to provide a high impedance multiplier probe structure which substantially eliminates all of the capacity loading effect which would otherwise render the probe ineffective.

The foregoing object is achieved by this invention which comprises an improved multiplier probe structure wherein a gradient shield surrounds the series resistor in the probe. The shield may be either of resistive material or may be a specially constructed capacitive shield. In either case, the shield provides a potential gradient along its length corresponding at every point with the potential gradient along the series resistor. The result is that there is no potential difference at any point between the shield and the series resistor and consequently no capacitive loading effect by reason of the complete absence of displacement current between the shield and the series resistor. The potential gradient along the shield is provided by a feedback from the meter circuit to which the probe is connected.

Figure 5C:
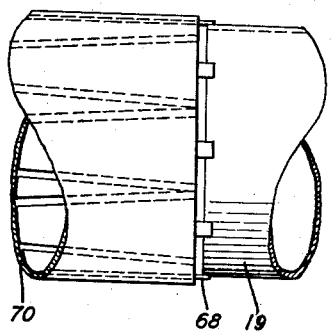
Figure 5B:
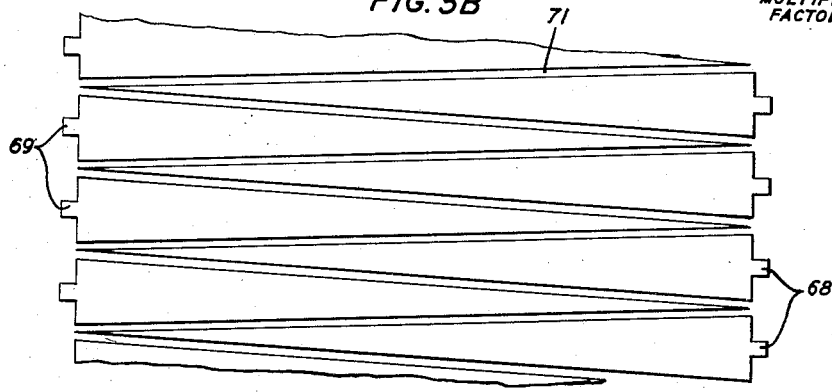
Figure 5A:
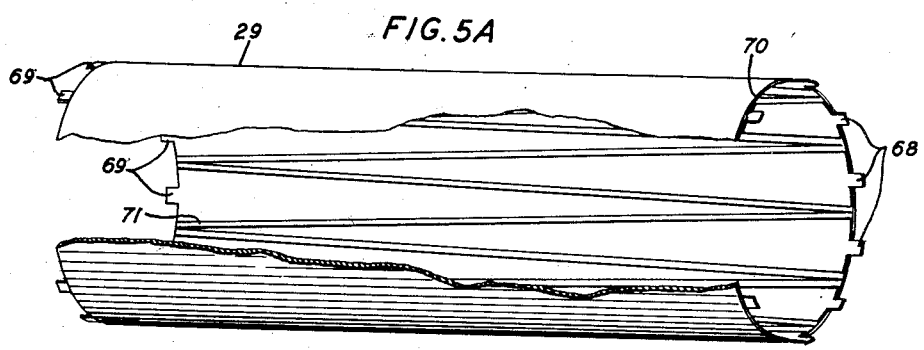

The invention may be better understood by referring to the accompanying drawings in which:

Fig. 1 discloses one embodiment of a probe structure in accordance with this invention;

Fig. 2 discloses a modification of the probe in Fig. 1 in which a leakage guard is included;

Figs. 3 and 4 disclose modified forms of resistive shields which may be substituted for the resistive shield shown in Fig. 1;

Figs. 5A, 5B and 5C disclose a gradient shield embodying a capacitive means;

Fig. 6 shows a preferred form of voltmeter amplifier circuit suitable for use in the practice of this invention;

Fig. 7 discloses a power supply for the amplifier of Fig. 6; and

Figure 8:
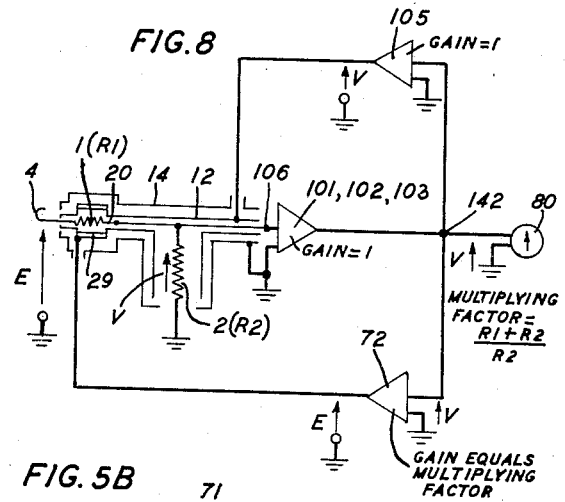

Fig. 8 shows a simplified schematic embodying the invention in a meter circuit.

The nature of the gradient shield of this invention may be more easily understood by placing Fig. 1 to the left of Fig. 6. The probe in Fig. 1 is shown enlarged to about twice its actual size. It will be noted that the basic multiplier circuit comprises two series-connected resistors. Resistor 1 is located centrally in the cylindrical probe structure of Fig. 1 and it will be noted that it is connected in series with one of the selected resistances 2 of Fig. 6 by way of the central conductor 9 of the cable in Fig. 1, through the tip contact 6 of the plug, tip contact 106 of the jack in Fig. 6, switch 109 which is assumed connected to contact 3, switch 78 and selected resistor 2. The fraction of the voltage to be measured, which appears across resistor 2, is thus applied to the grid of tube section 101 in the meter amplifier circuit. This circuit will be described in greater detail later. The basic multiplier circuit just described is also shown in the simplified schematic of Fig. 8.

In ordinary probe structures the series resistance 1 of Fig. 1 is simply enclosed within a grounded tube such as case 30. For that type of construction it is evident that there will be a potential difference between resistor 1 and the case 30. The capacity current produced by this potential difference places a load on the probe. The effect of this load can be better appreciated when it is realized that resistor 1 is necessarily quite large, preferably in the order of 50,000 megohms. This capacity loading effect can be eliminated if some means is provided to surround resistor 1 with a shield which maintains a substantially zero potential difference between itself at every point along the length of series resistor 1.

In accordance with this invention, this is accomplished by surrounding the series resistor 1 with a gradient shield 29, the ends of which are connected to an amplifier in the meter circuit and impressing upon this shield a potential difference which is at every instant exactly equal to the potential difference appearing across series resistor 1. The amplifier also maintains each end of the shield 29 at a potential equal to that of the adjacent terminal of resistor 1.

In the embodiment shown in Fig. 1, the gradient shield 29 comprises a ceramic tube 31 having a uniformly deposited resistive coating 32 on its outer periphery. Near its ends, this resistive coating is preferably plated with a conductive metal, as for example copper. This plating will extend a length co-extensive with the overlap of supports 19 and 25, respectively. The length of the resistive coating 32 between the plated ends is preferably equal to the length of the resistor 1. These supports are then soldered to the plated ends of the resistive shield and the supports are electrically connected to amplifiers 72 and 105 in Fig. 6. Assuming switch 119 is connected to line 120 in the output circuit of amplifier 105, the circuit may be traced from the output circuit of amplifier 105 by way of switch 119, shield 111, the ring conductor 11 of the jack, the ring conductor 8 of the plug, the inner cable shield 12 and the inner conical shield 18 at the rear of the probe. Shield 18 is electrically connected to rear support 19 which in turn is connected to the rear end of the gradient shield 29. From the front end of shield 29 the circuit is traced to the front shield support 25, to conductor 26, the central conductor 54 of the auxiliary cable 51, to tip 55 of the auxiliary plug and to the tip 57 in the jack of Fig. 6 which is connected to the output circuit of amplifier 72.

The amplifier circuit of Fig. 6 is especially suitable for use with this invention. Much of this circuit is disclosed and claimed in the copending application of Ohmer R. Miller, Serial No. 364,409, filed June 26, 1953. Sufficient description of this circuit will be included to enable one to fully understand its operation and its relation to the present invention. The amplifier incorporates, along with means for controlling the input resistance, an independent means for controlling the effective input capacitance presented by the grid circuit of tube 101. Tubes 101 and 102 are enclosed in an electrostatic shield 111 which may be either connected to ground or to a capacitance control circuit by operating the two-position switch 119. A switch 109 is also provided within the shield for connecting the grid to ground through conductor 110 or to the shield through a capacitor 108. The grid is grounded when adjusting other portions of the circuit. Capacitor 108 provides additional input capacitance where that is desired.

A source of constant potential is provided by a gaseous regulator tube 161 across which is connected a potential divider circuit 162, 163, 164, the resistances of which are all very small compared with the resistance of resistor 112. It will be understood that this circuit arrangement will provide a substantially constant potential between conductors 113 and 114. Resistors 162 and 163 are preferably made equal and the junction is connected by way of conductor 171 to the center tap of the heater winding in transformer 169 which provides current to the heater of tubes 101 and 102. It will thus be evident that a fixed potential difference will be also maintained between the heater and the cathodes within the tube.

The output of cathode follower tube 102 is connected to a direct-coupled amplifier 103 through a series resistor 117. Amplifier 103 is provided with a feedback resistor 131 so as to stabilize its gain. The output of amplifier 103 is connected to output terminal 142 by way of conductor 135. The meter 80 is connected between output terminal 142 and ground terminal 143. Conductor 135 is also connected to the input circuits of another direct-coupled amplifier 104 by way of conductor 136. Amplifier 104 may comprise a shunt feedback type amplifier 150 and a cathode follower stage 151. The output resistance for tube 151 is provided by the resistor 165 which is connected to the negative terminal of source 145 shown separately in Fig. 7. The anode of tube 151 is connected to the positive terminal of source 144, also shown in Fig. 7.

The gain of amplifier 104 may be varied by varying the resistance of the feedback circuit comprising resistor 160, a variable resistor 159 and resistor 155. The gain of this amplifier may also be varied by adjusting the input potentiometer 152. The manner in which these adjustments are made will be described in greater detail later.

The output conductor 135 from amplifier 103 is also connected to a potentiometer 202 by way of conductor 137. A resistor 203 may be connected in series with potentiometer 202 to provide a suitable adjustment range for the potentiometer. The slider of potentiometer 202 is connected to amplifier 105 by way of series resistor 204. This amplifier is also of the shunt feedback type and the feedback circuit comprises series resistors 208 and 209, the latter being adjustable to adjust the gain of the amplifier. Here again it will be noted that the amplifier gain can be also adjusted by the input potentiometer 202. The output of this amplifier is connected to a point on switch 119 by way of conductor 120. This output is used for driving the shield 111 to reduce the effect of the shield on the input capacitance. The gain of amplifier 105 can be adjusted to completely eliminate this capacitance effect although greater circuit stability is ordinarily obtained if it is not quite all eliminated.

In view of the fact that the amplifiers employed are preferably all of the direct-coupled type, some grid current drift may occur from time to time caused by a small drift in the anode and cathode potentials of tube 101. This may be very quickly corrected by means of a drift control 198 provided by a pair of ganged potentiometers 183 and 188 connected into the grid circuits of tube 151 and amplifier 150. The sliders of these two potentiometers are connected through resistors 177 and 189, resistor 177 being connected directly to the grid of tube 151 and resistor 189 to the junction between resistor 160 and variable resistor 159 in the feedback path. It will be evident that when these ganged potentiometers are simultaneously adjusted, a slight change in bias is injected into the grid-cathode circuit of tube 151, thus changing the potential drop across cathode resistor 165. This produces equal changes in the potentials of the anode and cathode of tube 101 with respect to their grid. An opposite bias is also injected into the feedback path to amplifier 150.

The apparatus of Fig. 6 may be set up and adjusted for operation by employing well-known laboratory apparatus and techniques. In making these adjustments, the following requirements should be observed. With the drift control 198 centered, the grid of tube 101 is intermittently grounded and opened by switch 109. The output voltage between terminals 142 and 143 will remain zero during this operation provided proper zeroing adjustments have been made. This condition should prevail even though the two gain controls 152 and 202 or gain control 159 in amplifier 104 are moved throughout their ranges. This zero condition may be accomplished by adjusting the static bias of the tubes in direct-coupled amplifiers 103, 104 and 105.

Then, with the input to amplifier 104 grounded and a known voltage applied to the input terminals 106 and 107, amplifier 103 is adjusted to provide a gain of unity from the input of tube 101 to the output terminals 142 and 143. This adjustment is preferably made by adjusting feedback resistor 131 of amplifier 103.

The gain of amplifier 104 must also be set to unity by adjusting feedback control 159 while gain control 152 is at its mid-position.

Amplifier 105 is similarly adjusted to unity gain by means of gain control 209, this adjustment being made with potentiometer 202 near its upper end.

With the system of Fig. 6 adjusted as just described, it will be apparent that the mid-position of gain control 152 corresponds to an infinite input resistance for the grid circuit of tube 101. This is due to the fact that the zero adjustments for amplifiers 103 and 104 were such as to establish the proper potentials for the anode and cathode of tube 101 so the grid current will be zero. This was evidenced by no drift from the zero output voltage when the grid of tube 101 was ungrounded. An adjustment of potentiometer 152 for less gain will cause the grid circuit of tube 101 to have a positive resistance while a negative resistance results from an adjustment for more gain. A suitable resistance scale may be inscribed on this potentiometer as symbolically indicated in Fig. 6.

Similarly, the upper position of potentiometer 202, corresponding with unity gain, will cause amplifier 105 to maintain the shield 111 at grid potential, thereby eliminating all the input capacitance to tube 101. This point on the potentiometer is inscribed with a zero. Adjustments of this potentiometer for less gain gradually increases the effective input capacitance and a scale on this potentiometer may be inscribed in terms of capacitance units or in terms of percent of some predetermined capacitance.

Should small drifts from the zero grid current condition occur, the drift control 198 will change the bias of tube 151 sufficiently to restore the required zero condition.

The anode and cathode potentials of tube 101 are such that when the input potential is zero between input terminals 106 and 107 no grid current will flow. This zero grid current condition, if maintained over an appreciable input voltage range, will represent an infinite input resistance looking into the amplifier input circuit from terminals 106 and 107. The infinite resistance circuit condition may be maintained over a substantial range of input voltages provided that the potentials of both the anode and the cathode of tube 101 are caused to vary in the same sense and by the same amount that an applied input potential causes the grid potential to change. This is accomplished by the positive feedback circuit provided by amplifier 104. All potentials, unless otherwise stated, are referred to ground. It will be evident that, for a substantially constant anode and cathode potential difference, the space current in tube 101 will remain substantially constant provided that the potential difference between the grid and the cathode also remains substantially fixed. Consequently, the potential drop across resistor 112, which may be in the order of 5 megohms, remains substantially unchanged. The effect of the positive feedback is therefore to cause the anode and cathode of tube 101, together with the resistor 112 and its entire plate current supply network, to change potential in the same sense and by the same amount that the applied voltage causes the grid to change.

It will now be apparent that if the positive feedback is not quite large enough to cause the system comprising the plate supply source and the anode and cathode of tube 101 to change in potential by the same amount as the grid voltage changes, some grid current will flow depending upon how much the potential of this system differs from the grid potential. An insufficient amount of positive feedback will cause the input circuit to appear to have a positive resistance since the current will flow through the grid circuit in the same direction as the impressed input voltage between terminals 106 and 107. This effect is accomplished by providing amplifier 104 with a gain slightly smaller than necessary to maintain the infinite input resistance condition.

Conversely, if amplifier 104 is provided with more gain than is necessary to maintain the infinite input resistance condition, the system comprising the power supply and the anode and cathode of tube 101 will change in potential by an increment greater than the potential change of the grid. This will cause the grid to supply current to the source connected to terminals 106 and 107 so that the input circuit will appear to have a negative resistance. In other words, the current flowing through the grid circuit is in a direction opposite to the polarity of the applied input potential.

The foregoing description relates to that part of the amplifier of Fig. 6 which was disclosed and claimed in the above-mentioned copending application. In addition to the amplifier sections described above, amplifier 72 is added to drive the gradient shield of this invention. The input circuit of this amplifier is coupled to the output terminal 142 through a potential divider comprising a potentiometer 75 and a resistor 76. A series resistor 74 connects the slider of potentiometer 75 to the input terminal of the amplifier and a group of feedback resistors 73, which may be selected by switch 79, connects the output circuit of amplifier 72 to its input circuit. This type of feedback amplifier is the same as described above for amplifiers 103, 104 and 105. While this amplifier is preferred, any amplifier may be used which may be stabilized as to gain and which may have its gain adjusted by a convenient switch arrangement such as switch 79.

To understand how this portion of the circuit operates with the probe of this invention, it must be remembered that the amplifier circuits of Fig. 6 were adjusted so that the voltage between the output terminal 142 to the ground terminal 143 is exactly equal to the voltage applied between the grid of tube section 101 and ground. As explained above, amplifier 105 is arranged to drive the shield 111 surrounding tube 101 such that this shield is always at the same potential as the voltage on the grid of tube section 101. Therefore, there is no potential difference and consequently no displacement current between this grid and shield 111. Similarly, since shield 111 is electrically connected by way of jack ring 11 and plug ring 8 to the inner cable shield 12, inner conical shield 18 and rear shield support 19, it follows that the rear end of the gradient shield 29 is at the same instantaneous potential as the rear end of series resistor 1. Consequently, no displacement current can flow between the rear end of series resistor 1 and the rear end of the gradient shield 29.

Referring again to Fig. 6, amplifier 72 is similarly arranged so that its output voltage is exactly equal to the potential applied to the front end 4 of the series resistor 1 in the probe structure. Since the output circuit of amplifier 72 is connected by way of the auxiliary cable 51 to the front shield support 25, it necessarily follows that the instantaneous potential of the shield support 25 is also equal to the potential of the front end of series resistor 1. It will thus be noted that the opposite ends of the gradient shield 29 are always at the same instantaneous potentials as the corresponding ends of the series resistor 1. Series resistor 1 is preferably constructed substantially linear so that a uniform fall of potential occurs along its length. The resistive material 32 is uniformly deposited so that the potential drop along the length of gradient shield 29 is also uniform. It will therefore be evident that at any point along the length of series resistor 1 there will be no potential difference between the surface of this resistor and the immediately adjacent portion of the shield 29.

It is preferred that the outer case 30 of the probe structure be maintained at ground potential. This is accomplished by connecting it to the outer conical shield 17 by means of screws 47. Shield 17 is soldered to the outer cable shield 14 of cable 15 which in turn is connected to ground by way of plug sleeve 7 and jack sleeve 107.

The probe structure of Fig. 1 may be assembled by observing the following assembly order. The gradient shield 29 and the inner insulators 21 and 24, which preferably may be of isolantite or of other ceramic material, are first placed on the series resistor 1. At this time the front lead 4 of resistor 1 is straight. It will be convenient to have the inner insulators 21 and 24 held in a jig. After properly positioning resistor 1, its lead wires are securely cemented to the insulators at 35 and 36. The rear shield terminal support 19 is then installed and securely cemented as at 38 and 39 to the rear insulator 21. The short connecting wire 26 is then soldered to the front shield support 25 after which this support is installed over the front insulator 24 and positioned to include the gradient shield 29 between the front and rear supports 19 and 25, respectively, as shown in Fig. 1. The plated ends of shield 29 are then soldered to supports 19 and 25, as shown at 33 and 34. The front support 25 is cemented to the front insulator 24 at 37.

The outer insulators 22 and 23 are then slipped over their respective shield supports 19 and 25, secured by the jig and cemented in place as at 40, 41 and 42.

The rubber sleeve 16 is placed on the cable 15 clear of the end preparatory to pulling into final position at the completion of the assembly. The outer conical shield 17 is similarly placed on the cable. The end of the double-shielded cable 15 is prepared by stripping the outer jacket, the braids and the inner conductor approximately as shown in Fig. 1. The inner conical shield 18 is made of two parts, only one part of which is shown in Fig. 1. This part is soldered to the rear shield support 19. The inner conductor 9 is secured to the rear lead wire 20 and soldered as at 5. The other half of the inner conical shield 18 is then placed over the opening to complete the enclosure. It will be understood that the two halves of the shield 18 are substantially identical and that the second half is also soldered to the rear shield support 19. The inner braided shield 12 of the cable is laid up near the apex of the conical shield 18 and soldered thereto as at 45.

The outer case 30 is now installed over insulators 22 and 23 making certain that the opening in the case is opposite conductor 26. This case is then cemented to the outer insulator 23 as at 43 and to the outer insulator 22 at 44. The outer conical shield 17 is then secured to the rear of the case 30 by means of screws 47. The outer braided shield 14 of cable 15 is then laid up on the outer cone 17 and soldered thereto as at 46. This part of the assembly is completed by drawing the rubber sleeve 16 up over the conical end of the probe structure. This rubber sleeve has no functional purpose insofar as the operation of the probe is concerned but serves to cover the soldered joint between the outer braided shield 14 and the outer cone 17.

The connecting wire 26 is fished through the opening in the case 30 and a short length of spaghetti tubing 28 is placed thereon. The conductor of cable 51 is stripped and soldered to the outer end of conductor 26 as at 50 after which the spaghetti tubing is pulled up over the joint. The cover clamp 48 is secured to the case 30 over the opening through which conductor 26 was drawn and the rear clamp 49 secures the cable 51 to the rear of the probe. It is convenient to bind cables 15 and 51 together throughout most of their lengths and this may be done by any conventional means.

To reduce the leakage between the front lead wire 4 of resistor 1 and the front shield support 25, a guard ring 61 may be installed as shown in Fig. 2. This guard ring inherently introduces a small amount of displacement current but the ring is nevertheless useful at low frequencies when measuring high resistance sources. Except for the addition of this guard ring and the substitution of two concentric insulators 59 and 60 in place of the single front insulator 24 of Fig. 1, the structure of Fig. 2 is identical with that of Fig. 1. The guard ring 61 is connected to the grounded case 30 by way of a short conductor 62 which passes through a small hole 63 in the front shield support 25. Conductor 62 is soldered to the guard ring 61 at 64 and to the case 30 at 65. Assembly may be conveniently made by having conductor 62 soldered to guard ring 61 before assembly of the guard ring with insulators 59 and 60. Conductor 62 is then fished through the opening 63 as support 25 is installed in place. Finally, conductor 62 is centered in hole 63 and soldered at 65.

In Figs. 3 and 4 are shown two resistive shields which may be used in place of shield 29 of Fig. 1. The arrangement shown in Fig. 3 comprises a coil of resistive wire 66 surrounding the ceramic tube 31. The ends of this resistance wire are connected to the supports 19 and 25 by soldering.

In Fig. 4 the tubular shield 29 consists of a resistive ceramic material 67 which may constitute a substantially homogeneous mixture of a conductive material such as graphite in a ceramic binder. The ends of this tube may be plated and soldered to the supports.

The gradient shields described in Figs. 1 to 4 are all of a resistive character. However, it is quite possible to construct a capacitive shield having substantially the same effect insofar as capacitive loading is concerned. Such a shield is shown in Figs. 5A, 5B and 5C. In Fig. 5A it will be noted that closely spaced thin triangular plates 68 and 69 are secured to the inner surface of an insulating tubular support 70. These are uniformly spaced apart as shown for example at 71 and are preferably either cemented or formed by plating to the inside surface of support 70. Connections for these tubular plates 68 and 69 extend outwardly for connection to the supports 19 and 25. It will be noted that all of the plates 68 are connected together to support 19 shown in Fig. 5C while the connectors for plates 69 are similarly connected by soldering to the support 25 shown in Fig. 1. Fig. 5B shows a development of the plates 68 and 69 to show more clearly their physical relationship inside the shield 29.

Since these electrostatic plates are all triangularly shaped, it will be evident that the total capacitance between the plates 68 and resistor 1 is maximum opposite the rear end of resistor 1 adjacent the shield support 19 while the opposite is true for the triangular plates 69. Plates 69 have a maximum total capacitance with the resistor at the front end adjacent support 25.

The average displacement current of one set of plates exactly cancels the displacement current of the other set of plates at any point along the length of the series resistor 1. It should be noted that these displacement currents with respect to resistor 1 will be of opposite phase. Insofar as series resistor 1 is concerned, the net effect is the same as for the resistive shields since the displacement current to the resistor is effectively eliminated.

In order to extend the use of this probe to cover a range of voltages, a plurality of shunt resistors 2 are provided. In Fig. 6 three such resistors are shown, any one of which may be selected by switch 78. Switch 78 and switch 79 are ganged together through a switch link 77. In order, also, to drive the front end of the gradient shield 29 at the same potential as the front end of series resistor 1, it is necessary for amplifier 72 to have a gain which is the reciprocal of the loss introduced by the voltage divider comprising series resistor 1 and the selected shunt resistor 2. This relationship is more easily understood by reference to Fig. 8 where the circuits have been simplified for this purpose. The reference numerals correspond with those in Figs. 1 and 6. By way of a specific example, it may be assumed that without the use of this probe structure the meter circuit may respond linearly to a voltage range of 15 volts. This voltage may be either direct or alternating provided that the amplifiers employed are of the direct-coupled type. Since the gain through the amplifier from terminal 106 connected to the grid of tube section 101 to the output terminal 142 is made unity, the voltage range at terminal 142 is also 15 volts.

Instead of a 15-volt range, an input voltage range of 30 volts may be measured if the resistance of selected resistor 2 is made equal to the resistance of resistor 1. In the absence of capacitive loading, a voltage range of 30 volts applied to the front end 4 of the probe structure will thus impress a voltage range of 15 volts on the grid of tube section 101 as before, thus resulting in a loss ratio of ½ to give the required 15-volt range at the output terminal 142. In order that the outer end of the gradient shield 29 be driven over a voltage range of 30 volts, it is now necessary to provide amplifier 72 with a voltage gain of two. This is conveniently done by selecting an appropriate size for feedback resistor 73 of amplifier 72, shown in Fig. 6. Thus the gain ratio of amplifier 72 is the reciprocal of the loss ratio of the voltage divider.

The other two resistors shown at 2 in Fig. 6 may be conveniently selected to provide other loss ratios of ⅕ and ⅒, respectively, the latter ratio providing for a test voltage range of 150 volts based upon the 15-volt example given above. Consequently, resistors 73 will be simultaneously selected by switch 79 to provide amplifier 72 with voltage gain ratios of 5 and 10, respectively, so that the outer end of the gradient shield 29 is driven at the same potential as the potential applied to the front lead wire 4 of series resistor 1.

What is claimed is:

1. A high impedance multiplier probe comprising two resistors connected in series, the ratio of the sum of their resistances to the resistance of the second resistor being the desired multiplier factor, means for connecting a voltage to be measured across said series connected resistors, means for connecting said second resistor across a voltage indicating means, a shield surrounding said first resistor and insulated therefrom, said shield being adapted to produce an effective potential gradient along its length, a first amplifier and a second amplifier, each with input and output circuits, said first amplifier capable of producing a gain equal to said multiplier factor, said second amplifier being capable of unity gain, means coupling the input circuits of both amplifiers across said second resistor, and means connecting their output circuits to opposite ends of said shield whereby a voltage may be applied thereto to produce a potential gradient along its length equal to the gradient inherently along said first resistor.

2. A high impedance multiplier probe comprising a first and a second resistor connected in series, the ratio of the sum of their resistances to the resistance of the second resistor being the desired multiplier factor, means for connecting a voltage to be measured across said series connected resistors, said voltage being subject to arbitrary variations with respect to time, means for connecting said second resistor across a voltage indicating means, a shield surrounding said first resistor and insulated therefrom, said shield being adapted to produce an effective potential gradient along its length, first amplifier means having an input circuit and an output circuit and a gain equal to said multiplier factor, said input circuit being coupled to said second resistor whereby the output circuit will produce a voltage equal to said voltage to be measured, a second amplifier means of unity gain having an input circuit and an output circuit, said input circuit also coupled to said second resistor whereby the output circuit will produce a voltage equal to that across said second resistor, and means for respectively connecting the output circuits of said two amplifier means to opposite ends of said shield whereby the shield may have a voltage gradient at every point along its length substantially equal to the gradient inherently along said first resistor.

3. The combination of claim 2 wherein said first-named resistor is substantially cylindrical and said shield comprises a tubular resistor substantially coaxial with said cylindrical resistor.

4. The combination of claim 2 wherein said first-named resistor is substantially cylindrical and said shield comprises a hollow cylindrical support upon a surface of which is a plurality of substantially triangular conductive plates, one-half of said plates comprising a first group positioned with their bases connected together near one end of said support and with their apices located near the other end of said support, the remaining plates comprising a second group alternately disposed between and insulated from said first group with their bases similarly connected together near said other end of said support and adjacent the apices of the first group.

5. A high impedance multiplier probe comprising two resistors connected in series, the ratio of the sum of their resistances to the resistance of the second resistor being the desired multiplier factor, means for connecting a voltage to be measured across said series connected resistors, said voltage being subject to arbitrary variations with respect to time, means for connecting said second resistor across a voltage indicating means, a shield surrounding said first resistor and insulated therefrom, said shield being adapted to produce an effective potential gradient along its length, first amplifier means having an input circuit and an output circuit and a gain equal to said multiplier factor, said input circuit being coupled to said second resistor whereby the output circuit will produce a voltage equal to said voltage to be measured, a second amplifier means of unity gain having an input circuit and an output circuit, said input circuit also coupled to said second resistor whereby the output circuit will produce a voltage equal to that across said second resistor, and means connecting the output circuit of said second amplifier means to one end of said shield at a point adjacent the circuit between said series-connected resistors, and other means connecting the output circuit of said first amplifier means to the opposite end of said shield.

References Cited in the file of this patent

UNITED STATES PATENTS

| | | |
|---|---|---|
| 2,583,540 | Bennett | Jan. 29, 1952 |
| 2,615,091 | Keitley | Oct. 21, 1952 |
| 2,685,673 | Avins | Aug. 3, 1954 |
| 2,721,908 | Moe | Oct. 25, 1955 |